Nov. 29, 1966  M. P. WOODWARD, JR  3,289,159
DIGITAL COMPARATOR

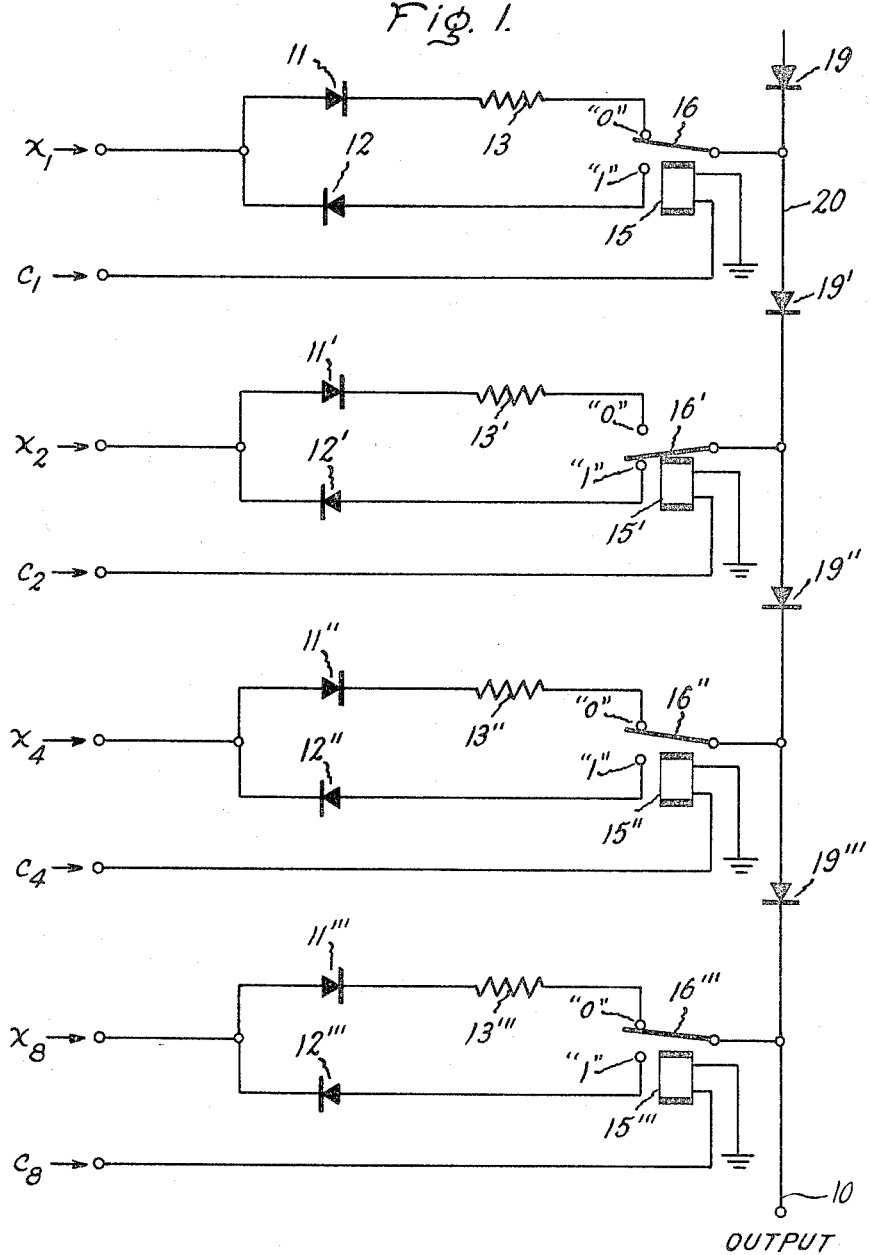

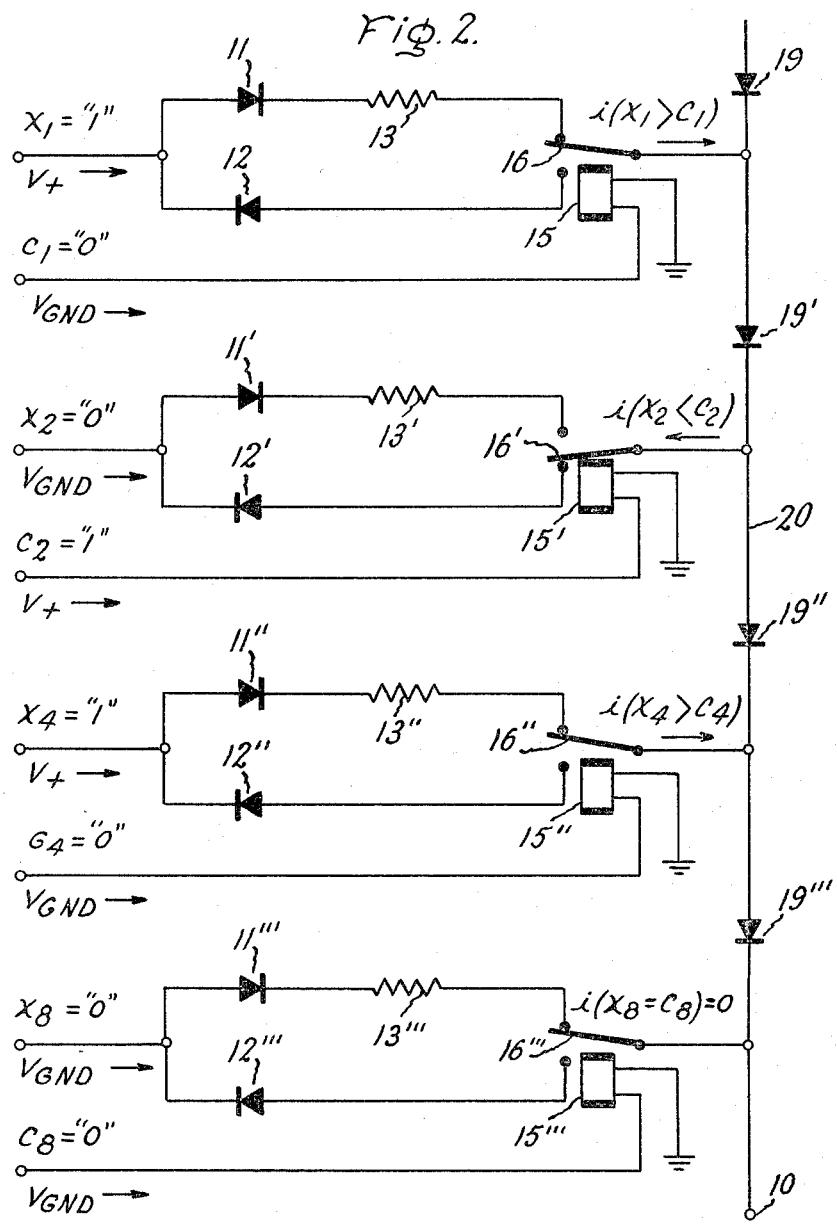

Filed March 18, 1963  3 Sheets-Sheet 3

Inventor:
Morton P. Woodward Jr.,
by *Dudley T. Ready*
His Agent.

United States Patent Office 3,289,159
Patented Nov. 29, 1966

3,289,159
DIGITAL COMPARATOR
Morton P. Woodward, Jr., Vestal, N.Y., assignor to General Electric Company, a corporation of New York
Filed Mar. 18, 1963, Ser. No. 265,845
6 Claims. (Cl. 340—146.2)

This invention relates to improved circuits for comparing an unknown group of digital input signals with a known group of digital limit signals to determine whether or not the unknown digital signals are greater than the limit signals representing a predetermined limit number. The improved circuits are particularly useful in computer systems, automatic test equipment and predetermined counters.

From an abstract point of view, the determination of whether or not one number is greater than another is one of the simplest logic operations. However, to provide apparatus to perform this logic function automatically and efficiently is difficult. From one point of view, there are two major causes of complication. The first is that the comparison of two numbers, even if they are two-state binary bits, requires the consideration of three conditions: greater-than, less-than and equal to. The second cause is that when the numbers being compared are each comprised of several bits or digits, the comparison requires consideration of the position of each bit or digit, that is, the order of significance. For example, consider a binary predetermined limit number 1010 and first and second unknown numbers, respectively, 1011 and 1001. While it is easy to automatically determine that the first unknown number exceeds the limit number, a comparator receiving the second unknown number must determine that although the last, or least significant, bit in the unknown number is greater than the last bit in the limit number (as for the first unknown number), the unknown number 1001 is less than the limit number 1010.

In the past, apparatus for comparing numbers has required multiple circuits with multiple interconnections and output signals or circuitry for making several sequential measurements.

Accordingly, it is an object of the invention to provide a digital comparator which provides a "GO," "NO-GO" output signal, directly at a single output terminal, where "GO" represents a signal at the output terminal corresponding to the condition that the unknown quantity is within the limit, that is, is less than or equal to the known limit quantity with which it is compared; and "NO-GO" represents a signal that the unknown quantity is greater than the known quantity with which it is compared.

It is a further object of the invention to provide a relatively simple digital comparator which obviates serial operations for a single comparison and avoids complex network type interconnections that are characterized by several logic operations with each bit.

It is another object of the invention to provide a digital comparator which can make continuous comparisons and/or which can change the limit number input without shifting or losing the unknown number input.

Briefly stated, in accordance with certain aspects of the invention, a digital comparator is provided in which the "GO," "NO-GO" output signal is derived from the input number signals by steering the input signal in a desired manner to an output terminal. For each digit signal a switching circuit is provided which has three conditions: it is a signal source when the unknown digit signal is greater than the predetermined limit digit; it is a signal sink when the limit digit is less than the unknown digit; and it is effectively an open circuit when the unknown digit and limit digit are equal. The individual switching circuits are cascaded to the comparator output terminal. Between each switching circuit output terminal and the adjacent circuit terminal is a rectifier which permits signal propagation only in one direction towards the comparator output terminal. The order of the switching circuits is from least significant digit towards the output terminal so that a "NO-GO" signal is produced if an unknown digit is greater than its limit digit and there are no intervening switching circuits where the limit digit is greater than the unknown digit.

The invention, together with further objects and advantages thereof, may best be understood by referring to the following description taken in conjunction with the appended drawings in which like numerals indicate like parts and in which:

FIGURE 1 is a schematic diagram of a preferred embodiment of the comparator;

FIGURE 2 is the FIGURE 1 comparator with representative input signals illustrating comparator operation;

FIGURE 3 is a truth table for a switching circuit of the FIGURE 1 comparator;

Figure 4:
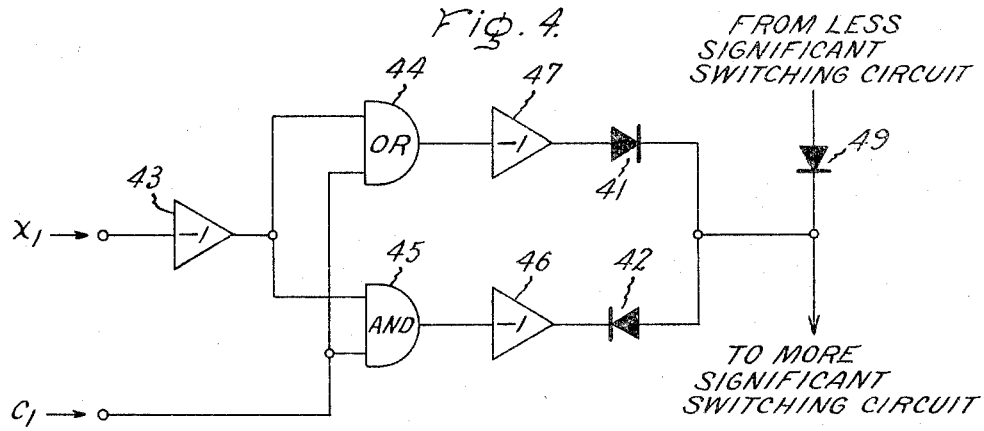
FIGURE 4 is another form of the comparator logic circuit.

Referring now to the drawings, FIGURE 1 illustrates a digital comparator circuit for a four bit binary number. The comparator is comprised of four switching circuits and interconnections to introduce the input bit signals and to connect the switching circuits to a common trunk line 20 in a cascade relationship. The switching circuits are arranged from top to bottom in ascending order of significant bits towards the "GO," "NO-GO" output terminal (FIGURE 2). The FIGURE 1 comparator is adapted to receive binary bit signals in the form of a plus voltage signal for a "1" bit and a system ground voltage level signal for a "0" bit. Correspondingly, the output signals are a plus voltage signal for "NO-GO" and a ground voltage level signal for "GO."

The switching circuit for the least significant bit, at the top of FIGURE 1, has two semiconductor diodes 11 and 12 arranged to be connected alternatively between the trunk line 20 and the source of signals representing the unknown binary digits. The unknown bit signal $x_1$ to be compared is applied to opposite polarity terminals of the respective diodes 11 and 12. Rectifier 11, together with a series connected resistor 13, thereby becomes a source of positive voltage signals. Rectifier 12 blocks positive voltages, but when $x_1$ is "0" and the limit quantity $c_1$ is 1, it acts as a grounded sink for positive signals applied through switch 16 to its anode from line 20. The rectifiers 11 and 12 form two branches which are connected alternatively to a common trunk line 20 leading to the output terminal 10 by a single pole, double throw, switching device 15. This S.P.D.T. switch is a self-latching relay. The contact arm 16 of relay 15 is illustrated in its normally de-energized position from which it is switched to the lower branch by a "1" limit signal $c_1$ being applied to the relay. Associated with the switching circuit is a rectifier 19 in the trunk line which steers the current signal from the switching circuit towards the comparator output terminal 10.

The remaining three switching circuits of FIGURE 1 are identical with the first switching circuit for the least significant digit $x_1$ and the corresponding components are represented with the same reference characters but having distinguishing primes. As a result, the switching circuits are cascaded by having the contact arms 16, 16', 16'', 16''' connected to the comparator output terminal 10 by means of the trunk line 20. Rectifiers 19', 19'', 19''' are placed in the trunk line between the respective contact arm junctions so as to pass signals towards terminal 10 but block reverse signal flow. Typically, the comparator of FIGURE 1 handles one decimal order for multi-decimal order numbers and rectifier 19 couples a less significant decimal order to the illustrated decimal order comparator.

FIGURE 2 illustrates the operation of the FIGURE 1 comparator for representative inputs 0101 and 0010 for the unknown number and the predetermined limit number respectively. In the least significant bit, the unknown bit is greater than the limit bit, $x_1 > c_1$. The result is that the top switching circuit operates as a potential source for a "NO-GO" signal on the trunk line at that point. The upper branch passes the positive voltage signal representing a "1" for the $x_1$ bit, through rectifier 11 and resistor 13 deriving a positive current signal which is passed by relay contact arm 16, in its upper or de-energized position to the line 10. The relay is de-energized as a result of the limit bit signal being a ground voltage representing a "0," to the trunk line 20. The switching circuit for next higher significant bit has conditions reversed from the least significant bit circuit, $x_2 = $ "0" and $c_2 = $ "1." Since $x_2 < c_2$, the second circuit operates as a signal sink for signals from less significant bit circuits. The current $i(x_2 > c_2)$ supplied to the line by the least significant digit circuit is shunted by relay contact arm 16′, in its latched lower position, to the lower branch through rectifier 12′ to the ground provided by $x_2 = $ "0." The third switching circuit produces a positive current signal, because $x_4 = $ "1," and $c_4 = $ "0," $x_4 > c_4$, in the same manner as for $x_1$. In the most significant bit switching circuit, $x_8 = $ "0" and $c_8 = $ "0," $x_8 = c_8$. As a result, relay contact arm 16‴ connects the trunk line 20 to its upper branch which is effectively an open circuit because the polarity of rectifier 11‴ is non-conductive to positive voltage from line 20. Therefore, a positive current signal $i(x_4 > c_4)$ flows from the 11″, 13″ circuit 3 through rectifier 19‴ to output terminal 10 representing "NO-GO." (If in the last switching circuit, $x_8 = $ "1" and $c_8 = $ "1," $x_8 = c_8$, the condition would remain the same. Although contact arm 16‴ would couple trunk line 20 to the lower branch through which positive current can flow, the positive voltage signal representing $x_8 = $ "1" opposes this flow so that the switching circuit is always effectively open for $x_8 = c_8$ and the "GO," "NO-GO" decision is passed to the next lower significant bit switching circuit.)

The description of the FIGURE 2 state of the FIGURE 1 comparator has preceded from the least significant bit switching circuit towards the most significant bit for the purpose of describing the comparator operation in detail. The principles of comparator construction are better considered in the reverse order. The comparator is comprised of a plurality of switching circuits, one for each digit to be compared. Each switching circuit performs the logic function defined by the truth table of FIGURE 3 in which the terms "GO" and "NO-GO" have the same significance as above, and PASS means that the output signal is that determined by the next lower significant digit. The switching circuits are then connected to the comparator output terminal so that the switching circuit for the most significant digit where $x_n \neq c_n$ determines the ultimate "GO" or "NO-GO" output. In other words, the most significant digit determines absolutely either "GO" or "NO-GO," unless the unknown and known most significant digits are equal, $x_{ms} = c_{ms}$, in which case it passes the decision to the next lower significant digit.

In the event that the unknown input number is identical with the limit, the cascaded comparison circuits present an open circuit condition to the output terminal 10. Output devices generally equate this condition with ground so that a "NO-GO" response is made. For example, voltmeters generally have a resistor which connects the output terminal to ground. If the output device chosen is not of a type which responds to an open circuit condition of the cascaded logic circuits in the same manner as for a grounded condition, one way to obtain such a response is to insert a resistor between terminal 10 and ground. The resistors 13 perform a similar function of the FIGURE 1 circuit by insuring proper voltage level conditions.

The FIGURE 1 circuit is illustrated as operating with a straight binary number system. Other forms of signals may also be used. For example, even a 4, $\bar{2}$, 2, 1 system can be used, wherein the bar over the first 2 bit indicates that it occurs first, that is, the second 2 appears only if the first $\bar{2}$ also occurs. It is only necessary that each bit represent a fixed value and that the bits of the number system can be assigned an order of significance.

Numerous possible modification of the FIGURE 1 circuit are apparent to those skilled in the art. For example, when the input signals represent a "1" by a negative polarity signal, the rectifiers are connected with their anodes and cathodes reversed and a "NO-GO" output signal will be represented by a negative polarity signal. Also, the S.P.D.T. switch device 15, instead of having its pole 16 connected directly to trunk line 20, can have its pole connected directly to the unknown bit input terminal to perform its branch selection function, and the other ends of the branches are connected in common to trunk line 20. Broader modifications include the substitution of transistorized switching circuits for the relays 15 and the use of flip-flops to receive input bit signals and apply them to the switching circuits.

The terminology and circuit description has been directed to automatic test equipment applications. It is for this reason that the term "NO-GO" has been applied to a "1" output representing that the unknown number exceeds the predetermined limit number. Typically, testing a quantity, such as a voltage, involves the selection of high and low predetermined limit numbers, the conversion of a measured analog voltage to digital signals and the steps of making two comparisons to determine if the measured quantity is equal to or within the limits. To provide output signals representing less-than, equal-to or greater-than, etc., are matters of choice which depend on the system in general and the particular application. For example, if the FIGURE 1 circuit is used to derive an output signal from a counter representing whether or not the number has reached or exceeded a predetermined count, the desired control signal must be generated when the unknown count is equal to the predetermined count. To implement this mode of operation for the FIGURE 1 comparator, it is only necessary to connect a source of positive signals to the end of the trunk line 20 farthest removed from output terminal 10. The comparator then passes these signals when the counter reaches the predetermined count and all the switching circuits are in an open condition. The comparator has the particular advantage that it can accept a change in the predetermined count and produce a control signal. It can also be easily adapted for counting up or down.

FIGURE 4 illustrates a switching circuit which is adapted for fast switching and is suitable for all solid state implementation. The unknown input bit signal $x_1$ and the limit input bit signal $c_1$ are applied in parallel to an "OR" gate 44 and an "AND" gate 45. The input signal $x_1$ as applied to the OR gate 44 receives a logical inversion by inverter 43 which produces a ground "0" signal for a positive polarity "1" signal and vice versa. The outputs by the gates 44 and 45 are inverted in the same manner by inverters 47 and 46, respectively. The signals being applied to the upper branch of the switching circuit through which the $x$ input is applied to the "OR" gate 44 operates as a signal source which is connected to the trunk line 60 through rectifier 41. Correspondingly, the lower branch operates as a signal sink with "AND" gate 45 connected to trunk line 60 through rectifier 42. A rectifier 49 steers the switching circuit signals towards the output terminal 50 in the same manner as the rectifier 19 in the FIGURE 1 comparator. As a result, the logic circuitry provides a switching function whereby the upper branch is effectively connected to the trunk line 60 when the limit signal is a "0" and the lower branch is connected when the limit bit is a "1." The "OR" gate 44, etc., functions to connect the x input through the upper branch when the c input is a "0," but the branch is effectively an open circuit when the x input is also a "0." Similarly, the "AND" gate 45, etc., functions to connect a ground to trunk line if and only if the c input is a "1," but the lower branch is effectively open if the x input is also a "1." It is evident that the specific switching functions of the gates and inverters can be implemented in several ways. For example, the "AND" and "OR" gates 45, 44 can be reversed; the inverter 43 switched to the c input; inverters 41, 43 removed; and the switching functions will be unchanged.

Figure 5:
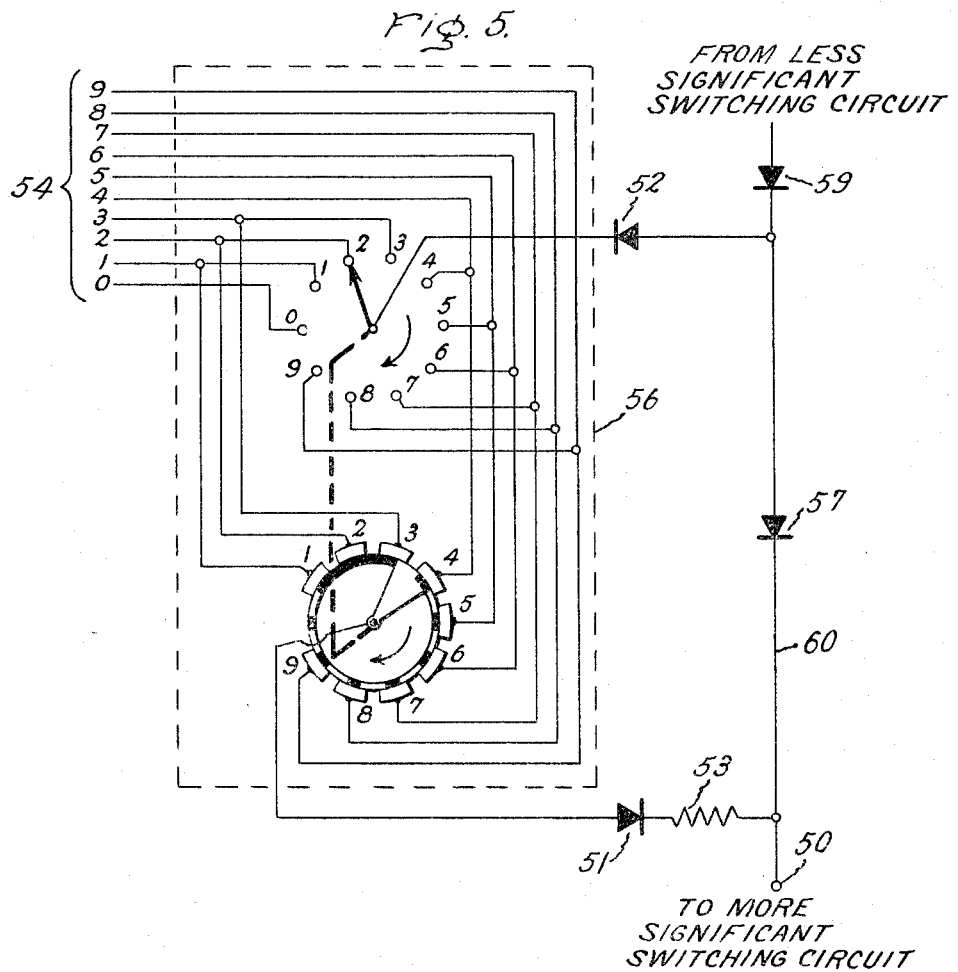
FIGURE 5 is a comparator logic circuit for a decimal system.

FIGURE 5 illustrates the invention as applied to a decimal comparator in which a decimal digit is represented by a positive pulse on one of ten lines 54. The comparator includes an output terminal 50, a trunk line 60, and a steering rectifier 59 which correspond to the components 10, 20 and 9, respectively, in the FIGURE 1 comparator. Similarly rectifiers 52 and 51, together with switch 56, perform the required logic function of passing a "NO-GO" signal to the output terminal 50 if the input digit signal exceeds the predetermined limit digit. The predetermined limit is introduced by the mechanical displacement of the switch 56 either automatically or manually. FIGURE 5 is shown with a "2" limit digit setting for the switch 56. Under this condition, a positive signal representing any number greater than the limit digit 2 passes through rectifier 51 to supply a "NO-GO" signal, by way of the lower bank of nine contacts on switch 56. If a signal is applied in the "2" digit line, it is connected through the upper bank of ten contacts on switch 56 to trunk line 60. However, rectifier 52 is connected so that positive signals can pass only away from trunk line 60, and the digit comparator will "PASS" to the next lower digit comparator. If the input signal is a "0" or "1," the "2" line will apply a ground level signal to the output terminal 50 representing "NO-GO" through the upper bank of contacts on switch 56. The switch 56, through its lower contact bank, connects all digit lines above the predetermined limit digit to the lower branch comprised of rectifier 51 and resistor 53; and switch 56, through its upper contact bank, connects the digit line for the predetermined digit to the upper branch comprised of rectifier 52. The rectifier 57 is provided so that the upper and lower branches are isolated from each other. Additional rectifiers (not shown) are employed to complete the isolation of the upper and lower banks except for positive signals directed towards output terminal 50.

There are essential features which are common to the embodiments illustrated and described above. The comparators are each comprised of a plurality of individual switching circuits that are simply cascaded by adding on circuits in accordance with the number of digits to be compared. The structure required is a common trunk line and rectifiers which steer the "NO-GO" signals in the direction of more significant digit logic circuits. Each switching circuit is basically comprised of two branches. One provides a potential "NO-GO" signal when the unknown digit is greater than the predetermined limit digit; the second branch provides a potential "GO" signal when the limit digit is greater than the unknown digit; and both branches "PASS" when the limit and unknown digits are equal. These functions, together with the steering function, have been described as utilizing rectifiers for implementation. However, components which operate as rectifiers for the above functions, such as logic circuitry, with or without additional operating features, would also be suitable. A further common feature of the embodiments is the use of switching means in the switching circuits to effectively select signal paths for the signals representing unknown digits through one of the branches in accordance with the predetermined limit number.

While particular embodiments of the invention have been shown and described herein, it is not intended that the invention be limited to such disclosure, but that changes and modifications can be made and incorporated within the scope of the claims.

What is claimed is:
1. A digital comparator for determining whether or not a plurality of signals representing a number in digital form is greater than a limit number comprising:
 (a) a plurality of switching circuits, each circuit including,
  (1) a single pole, double throw, switching means,
  (2) limit selector means for switching said S.P.D.T. means in accordance with a limit number signal,
  (3) a pair of parallel rectifier devices connected in parallel branches which are switched by said S.P.D.T. switching means, said rectifiers being connected with opposite polarity terminals connected to said S.P.D.T. means; and
 (b) rectifiers arranged between said switching circuits so as to pass signals, towards more significant digit switching circuits, which are greater than the limit signals and which isloate excess signals from the switching circuits of lower significant digits.

2. A digital comparator in which an unknown number, having digits represented by electrical signals on one or more lines, is compared in magnitude with a second digit number, representing a predetermined limit, the number system having the characteristics that each digit is assigned a fixed value and there being a fixed order of significance for the digits, the comparator comprising:
 (a) a trunk line providing a common output connection;
 (b) a plurality of switching circuits for receiving respective unknown digit signals and comparing them with the corresponding limit digits, each switching circuit including:
  (1) two parallel branches, each branch having a rectifier with opposite polarity terminals connected to said trunk line,
  (2) switching means for selectively closing the circuit for the unknown digit signals through said branches to said trunk line in accordance with a predetermined limit number in such a manner that unknown digit signals greater than the limit digit apply a "NO-GO" signal through one branch to said trunk line and unknown digit signals less than the limit digit apply a "GO" signal to said trunk line which override "NO-GO" signals from less significant digit switching circuits by connecting said trunk line to a signal ground so that any number of signals from lower switching circuits can be shunted away from the comparator output; and
 (c) rectifier means connected in said trunk line for steering "NO-GO" signals towards more significant digit switching circuits so that the most significant digit switching circuit produces the comparator "GO," "NO-GO" output signal or is effective to "PASS" to the next most significant digit switching circuit.

3. The comparator of claim 2 wherein said switching circuits produce the "NO-GO" signal when the unknown digit signal is less than the limit digit and produce the "GO" signal when the unknown digit signal is greater than the limit digit.

4. The comparator of claim 2 further comprising:
 (d) a least significant digit switching circuit which applies a "NO-GO" signal to said trunk line if the unknown digit signal is equal to or greater than the least significant limit digit and produces a "GO" signal if the unknown digit is less.

5. A digital comparator for determining whether or not a plurality of signals representing a number in binary form is greater than a limit number comprising:
 (a) a plurality of switching circuits, each circuit including,
  (1) a single pole, double throw, switch device of which the single pole terminal is the switching circuit output,
  (2) limit selector means for switching said S.P.D.T. device in accordance with a limit bit signal so that a "1" signal will steer a greater-than signal from a lower switching circuit towards a potential line,
  (3) a pair of parallel rectifier devices arranged between an input digit terminal and the S.P.D.T. switch device, said rectifiers being arranged with opposite polarity terminals connected to the unknown bit input terminal and their second terminals being selectively connected to the single pole of said S.P.D.T. switch device, the rectifier device poled to pass greater-than signals from lower switching circuits being connected directly to a signal sink; and
 (b) a plurality of rectifiers arranged between respective poles of said switching circuits so as to pass unknown bit signals to the output terminal which are greater than the limit signals and, which block greater-than signals from flowing towards the switching circuits of lower significant bits.

6. In a comparator for determining whether an unknown plural digit decimal number is greater than a limit number where the unknown digits are represented by a signal on one of ten digit lines comprising:
 (a) a trunk line;
 (b) a pair of parallel rectifiers connecting a first decimal digit input signal to said trunk line;
 (c) switch means connected to said pair of rectifiers to selectively couple one of said rectifiers in a closed circuit to said trunk line for digit signals greater than the limit digit and the other rectifier for digit signals less than the limit digit, said rectifiers having oppositely polarity terminals coupled to the unknown input signal; and
 (d) steering means connected in said trunk line between the junctions of pairs of rectifiers with said trunk line, said steering means passing signals applied to said trunk line only in one direction.

References Cited by the Examiner
UNITED STATES PATENTS
3,137,789    6/1964    Chiapuzio _____ 340—146.2

OTHER REFERENCES

Locke: "Electrical Decimal Comparison Circuit," IBM Technical Disclosure Bulletin, vol. 3, No. 1, June 1960, p. 61.

MALCOLM A. MORRISON, *Primary Examiner.*

M. J. SPIVAK, *Assistant Examiner.*

UNITED STATES PATENT OFFICE
CERTIFICATE OF CORRECTION

Patent No. 3,289,159                                 November 29, 1966

Morton P. Woodward, Jr.

It is hereby certified that error appears in the above numbered patent requiring correction and that the said Letters Patent should read as corrected below.

Column 6, line 26, for "isloate" read -- isolate --; column 7, line 12, for "wards a potential line," read -- wards a potential ground line, --.

Signed and sealed this 19th day of September 1967.

(SEAL)
Attest:

ERNEST W. SWIDER
Attesting Officer

EDWARD J. BRENNER
Commissioner of Patents